United States Patent
Sankaran

(10) Patent No.: US 7,701,881 B1
(45) Date of Patent: Apr. 20, 2010

(54) SYSTEM AND METHOD FOR DETERMINING THE MERGEABILITY OF SPANNING TREE INSTANCES

(75) Inventor: Genesh Chennimalal Sankaran, Adhanoor Madambakkam BO (IN)

(73) Assignee: Cisco Technology, Inc., San Jose, CA (US)

( * ) Notice: Subject to any disclaimer, the term of this patent is extended or adjusted under 35 U.S.C. 154(b) by 1152 days.

(21) Appl. No.: 10/893,071

(22) Filed: Jul. 17, 2004

(51) Int. Cl.
H04L 12/28 (2006.01)

(52) U.S. Cl. ...................... 370/256; 370/408

(58) Field of Classification Search .......... 370/254–258
See application file for complete search history.

(56) References Cited

U.S. PATENT DOCUMENTS

| | | | |
|---|---|---|---|
| 5,253,248 A * | 10/1993 | Dravida et al. | 370/256 |
| 5,606,669 A * | 2/1997 | Bertin et al. | 370/256 |
| 5,805,578 A * | 9/1998 | Stirpe et al. | 370/255 |
| 5,878,232 A * | 3/1999 | Marimuthu | 709/249 |
| 5,926,463 A * | 7/1999 | Ahearn et al. | 370/254 |
| 5,926,784 A * | 7/1999 | Richardson et al. | 704/9 |
| 6,246,689 B1 * | 6/2001 | Shavitt | 370/256 |
| 6,515,969 B1 * | 2/2003 | Smith | 370/256 |
| 6,915,340 B2 * | 7/2005 | Tanaka | 370/254 |
| 2003/0035417 A1 * | 2/2003 | Zirojevic et al. | 370/351 |
| 2003/0076832 A1 * | 4/2003 | Ni | 370/395.1 |

OTHER PUBLICATIONS

Sheng et al., "Routing state reduction in multicast protocols", Jun. 10, 1999, Electronics Letters, vol. 35, Issue 12, p. 970.*
Cisco Systems, Inc., Campus Manager 4.0 System Functional Specification, Document No. EDCS-306841, Revision 1, dated Jul. 31, 2003, Created by Campus Manager Development Team, 143 pages.
Cisco Systems, Inc., Campus Manager 4.0 System Functional Specification, Document No. EDCS-306841 Revision 4, dated Sep. 16, 2003, Created by Campus Manager Development Team, 139 pages.
Cisco Systems, Inc., "STP Recommendations" Course Number_ID, Copyright © 2001, 43 pages.

* cited by examiner

*Primary Examiner*—Chirag G Shah
*Assistant Examiner*—Joshua Smith
(74) *Attorney, Agent, or Firm*—Trellis IP Law Group, PC

(57) ABSTRACT

A system and method provide for reducing a number of topology instances in a network portion implementing a multiple instance topology. Various embodiments further provide for determining if one or more of the topology instances are merge-able or conditionally merge-able to form a lesser number of representative topology instances, and if so, for causing merging of the topology instances.

21 Claims, 15 Drawing Sheets

SYSTEM AND METHOD FOR DETERMINING THE MERGEABILITY OF SPANNING TREE INSTANCES

BACKGROUND OF THE INVENTION

1. Field of Invention

The present invention relates in general to the field of networking. More specifically, embodiments of the present invention provide systems and methods for managing multiple instances of a network topology.

2. Description of the Background Art

Computer interconnection and communication systems or "networks" have moved beyond traditional limitations to include more capable interconnection possibilities. A traditional local area network (LAN), for example, includes a shared, limited-bandwidth transmission medium that interconnects a limited number of devices (stations) over a small area. Each station has a fixed, globally unique address (unique identifier or UID), and communicates by sending and receiving data packets or groups of data packets. Data packets (packets) generally include a packet source address UID, a packet destination address UID and a payload, and the destination address typically includes a station address UID, a group address UID (multicast packet type) or a group address of all interconnected stations (broadcast packet type). More extensive network types, such as metropolitan area networks (MANs), wide area networks (WANs), and so on, can operate in a similar manner and can similarly comprise a linear, ring or multiple redundant (e.g., star, mesh, etc.) configuration.

LANs, however, provide useful high-speed communication services that facilitate data sharing, client-server or other interactions among its stations. LAN benefits have therefore been extended to enable two or more LANs to be physically interconnected via forwarding devices (bridges or other switches) to form LAN segments or "segments" of so-called extended LANs. An extended LAN can operate as with a single LAN and can typically include the combined number of stations, geographical extent and so on of each segment. Extended LANs can also now operate according to virtual interconnection topologies that define reconfigurable active and inactive interconnection paths to form so-called virtual LANs (VLANs). The same general mechanism can also be applied to network types other than LANs or some combination.

The Institute of Electrical and Electronics Engineering (IEEE) standards 802.1, for example, provide physical constraints and spanning tree protocol (STP) topologies for implementing extended LANs, or other so-called inter-networks. STP (IEEE Std. 802.1D-1990, IEEE Standards for Local and Metropolitan Area Networks: Media Access Control (MAC) Bridges), for example, is a layer 2 link management protocol that automatically forces all participating bridges into an acyclic or loop free tree that spans the entire extended network. During initialization, or further upon automatic or user STP parameter change or fault-causing re-initialization, the distributed STP algorithm causes all participating bridges to exchange data messages called bridge protocol data units ("BPDUs"). This exchange determines a root bridge ("root") as the logical center of the network, a closest (designated) bridge for each segment, and a shortest path to the root from each of the remaining (branch) bridges. Implementing STP also, for all branch bridges, automatically enables an active or forwarding state for the port having the shortest distance to the root (root port) and an outward connecting port (designated port), and automatically forces the remaining branch bridge ports (alternate ports) to a standby or blocking state. IEEE standards 802.1 are available via http://shop.ieee.org/store/ or otherwise from the Institute of Electrical and Electronics Engineering, and are hereby incorporated herein by reference.

The IEEE 802.1s (draft) standard extends the single spanning tree (SST) of IEEE 802.1D to enable the use of a LAN segment-specific STP, and IEEE 802.1w provides a rapid spanning tree protocol (RSTP) for faster convergence in establishing an STP-based configuration. Such standards are further extended by respective proprietary architectures from Cisco Systems, California, including Multiple Instance Spanning Tree Protocol (MISTP), Per-VLAN-Spanning Tree Protocol (PVST) and Rapid-Per-VLAN-Spanning Tree Protocol (rapid PVST or RPVST+). Among other features, IEEE 802.1s enables a set of Virual LANs (VLANs) to implement a separate STP instances and to enable the use of selectable STP instances, instance groups or associated instances or instance groups within or among LAN segments. (IEEE standards 802.1s and 802.1w are available via http://shop.ieee.org/store/ or otherwise from the Institute of Electrical and Electronics Engineering, and are hereby incorporated herein by reference. MISTP, PVST and RPVST+ are discussed, for example, by papers including a paper entitled Catalyst 6500 Series Cisco IOS Software Configuration Guide, 12.1E from Cisco Systems, which papers are hereby incorporated herein by reference.)

Using MSTP, each STP instance can have a topology independent of other spanning tree instances. Each participating bridge in a network portion including related STP instances (MST region) runs an internal spanning tree protocol and stores MSTP information for forming and selecting internal spanning tree (IST) instances. The MSTP information augments Common, Network-Wide STP information (CSTP) with the MSTP region information such that the resulting common and internal spanning tree instance set of the MSTP region operates as a CST subtree that appears to adjacent SST and MST regions as a single bridge. The STP, RSTP, and MSTP together elect a single bridge as the root of the CIST. Spanning tree information for each MSTP spanning tree instance (MSTI) is stored in an MSTP record (M-record) of an MSTP database and is encapsulated within MSTP BPDUs, the exchange of which is otherwise conducted in a similar manner as with STP information of SST implementations under IEEE 802.1d or per-LAN implementations under IEEE 802.1s.

Spanning trees computed by MSTP (M-trees) are active only within the MST region and merge with the IST at the boundary of the MST region to form the CST (e.g., see FIG. 1, a flow diagram illustrating a network implementing a conventional mixed STP and MSTP topology). MSTP otherwise operates in much the same way as SST, but on a per-instance basis. During initialization of each instance, or further upon automatic or user STP parameter change or fault causing re-initialization of an instance, a distributed STP algorithm causes participating bridges to exchange MST BPDUs, resulting in the determination of a root, backup or secondary root, per-region designated bridge and per-branch shortest path to the root; root and designated ports are also automatically enabled to a forwarding state and alternate ports are forced to a blocking state on a per-instance basis. Station addresses, however, are augmented with an extending instance identifier, e.g., 0, 1, 2 . . . , which identifier is stored as corresponding to the address and added to the MST BPDUs, and loops can be avoided using blocking states or by setting SST or MST region boundaries accordingly. Data packet transfer is also conducted in an otherwise consistent manner with IEEE 802.1d or IEEE 802.1s It will be appreciated that IEEE 802.1s provides certain advantages over the SST of IEEE 802.1D, for example, in enabling the topology for each segment in an extended LAN to be separately determined according to segment-specific requisites. Cisco architectures including MISTP also provide even further benefits, such as by enabling selection of faster paths to particular stations, load balancing, backup or other applications, while PVST, rapid PVST and PVST+ enable more practically implemented fault tolerance and other features. However, the use of increasing numbers of MSTP or MISTP instances can become problematic, particularly with regard to computational requirements, station storage and potential delays resulting from switching among the instances. An increasing probability also exists that instances might be created that fail to provide any further benefit, among other problems. Accordingly, there is a need for a system and method that are capable of reducing processing or otherwise facilitating handling of multiple topology instances, such as MSTP and Cisco's MISTP.

SUMMARY OF EMBODIMENTS OF THE INVENTION

Embodiments of the present invention provide systems and methods that are operable in networks supporting multiple topology instances for determining if one or more of the topology instances are merge-able to form a lesser number of representative topology instances, and if so, for causing merging of the topology instances. Various embodiments provide for conducting the determining or merging according to detecting a correspondence among prospective instances of forwarding link sets, blocking link sets or both, or for conducting the merging or determining concurrently on two instances or more than two instances. Various embodiments also provide for conducting the determining or merging in a more integrated or distributed manner, or for providing merging information to an affected station or stations as needed (for example, providing merge notification or data to a network bridge, switch or other participating network station employing the merge-able topology instances where the merging is conducted by an external station or other computing system).

Suitable multiple topology instance networks can, for example, include one or more of IEEE 802.1s, Multiple Instance Spanning Tree Protocol (MISTP) from Cisco Systems and/or other multiple instance topologies, and can further include networks employing only multiple instance topologies or networks employing multiple instance topologies and non-multiple instance topologies. Embodiments of the invention are also operable in networks employing other network features, including but not limited to convergence facilitating mechanisms (e.g., IEEE 802.1w, Cisco System's Per-VLAN-Spanning Tree Protocol (PVST), or Rapid-Per-VLAN-Spanning Tree Protocol (rapid PVST or RPVST+), among other features that might also be implemented.

A method according to an embodiment of the invention provides for comparing at least two topology instances, determining if the topology instances are merge-able to form one or more merged topology instances representing the at least two instances and, if so, for merging the topology instances to form the merged instances. In a further embodiment of the invention, the topology instances may be determined to be merge-able if the instances have the same forwarding or blocking topology. In another embodiment, the instances may be determined to be merge-able if: they share the same root, they are operative in a common part of a switched network (where both instances are running), and they share the same forwarding or blocking topology. In yet another embodiment, the instances are determined to be merge-able if: they share the same root, the instances are operative in the instance specific part of a switched network, and one of the instances will not be utilized.

A further method according to an embodiment of the invention provides for comparing a first topology instance with a second topology instance, determining if configuration information of one instance is redundant to configuration information of the other instance, and merging the instances if the configuration information is determined to be redundant.

Another method according to an embodiment of the invention provides for determining whether at least two topology instances are conditionally merge-able by performing a sub-tree reduction. The sub-tree reduction includes comparing a first link set of a first topology instance with a second link set of a second topology instance, and determining that the first instance is conditionally merge-able with the second instance if the first link set is a superset of the second link set. The link sets can, for example, include all forward links or all blocked links of both topology instances. In a further embodiment, a third link set of a third topology instance is determined to be conditionally merge-able with the first instance and the second instance if the first link set is a superset of the second link set and if the first link set is a superset of the third link set.

A further method according to an embodiment of the invention provides for determining whether at least two topology instances are conditionally merge-able by performing a conditional reduction. The conditional reduction comprises determining a forwarding symmetric difference between a first forwarding link set including all forwarding links of a first topology instance and a second forwarding link set including all forwarding links of a second topology instance. The method further comprises determining a blocking symmetric difference between a first blocking link set including all blocking links of the first topology instance and a second blocking link set including all blocking links of the second topology instance, and determining that the first instance is conditionally merge-able with the second instance if an intersection of the forwarding symmetric difference and the blocking symmetric difference is empty. In a further embodiment, a third link set of a third topology instance is determined to be conditionally merge-able with the first instance and the second instance if the first instance is determined to be conditionally merge-able with the second instance, if the first instance is determined to be conditionally merge-able with the third instance, and if the second instance is determined to be conditionally merge-able with the third instance.

A system according to an embodiment of the invention comprises coupled components including a topology instance merge-ability comparer for determining whether, within a network employing a multiple instance topology, a first topology instance is merge-able with a second topology instance, and a topology instance merger for merging the first instance with the second instance if the determining indicates that the first topology instance is merge-able with the second topology instance. Another embodiment further includes a topology instance merge notifier for at least one of notifying a station employing the first and second topology instances that merging is warranted and for transferring a merged instance to the station.

Another system according to an embodiment of the invention comprises coupled components including a topology instance root comparer and a topology instance merge-ability comparer, or further, at least one of a topology instance merger and a topology merge notifier.

Yet another system according to an embodiment of the invention comprises coupled components including a topology instance root comparer for determining, in a network employing a multiple instance topology, whether two or more topology instances share a common root and a topology instance use determiner for determining whether one of the topology instances will be used.

A further system according to an embodiment of the invention comprises coupled components including a forwarding/blocking link set comparer for comparing at least one of forwarding and blocking link sets of at least two topology instances, and a superset determiner for determining whether the one of the topology instances is a superset of at least one other of the topology instances. A more specific embodiment further includes a symmetric difference intersection engine for determining an intersection between a forwarding link set of the topology instances and a blocking link set of the topology instances.

Advantageously, embodiments of the present invention enable a reduction in a number of topology instances where one or more aspects of one or more of the topology instances is determined to be redundant. Embodiments further enable computational, storage or other resource utilization of at least one station implementing the multiple instances to be reduced, for example, in conjunction with storing topology instances, selecting a current topology instance, or determining a replacement topology instance in conjunction with a port or other error occurring during network utilization.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Figure 1:
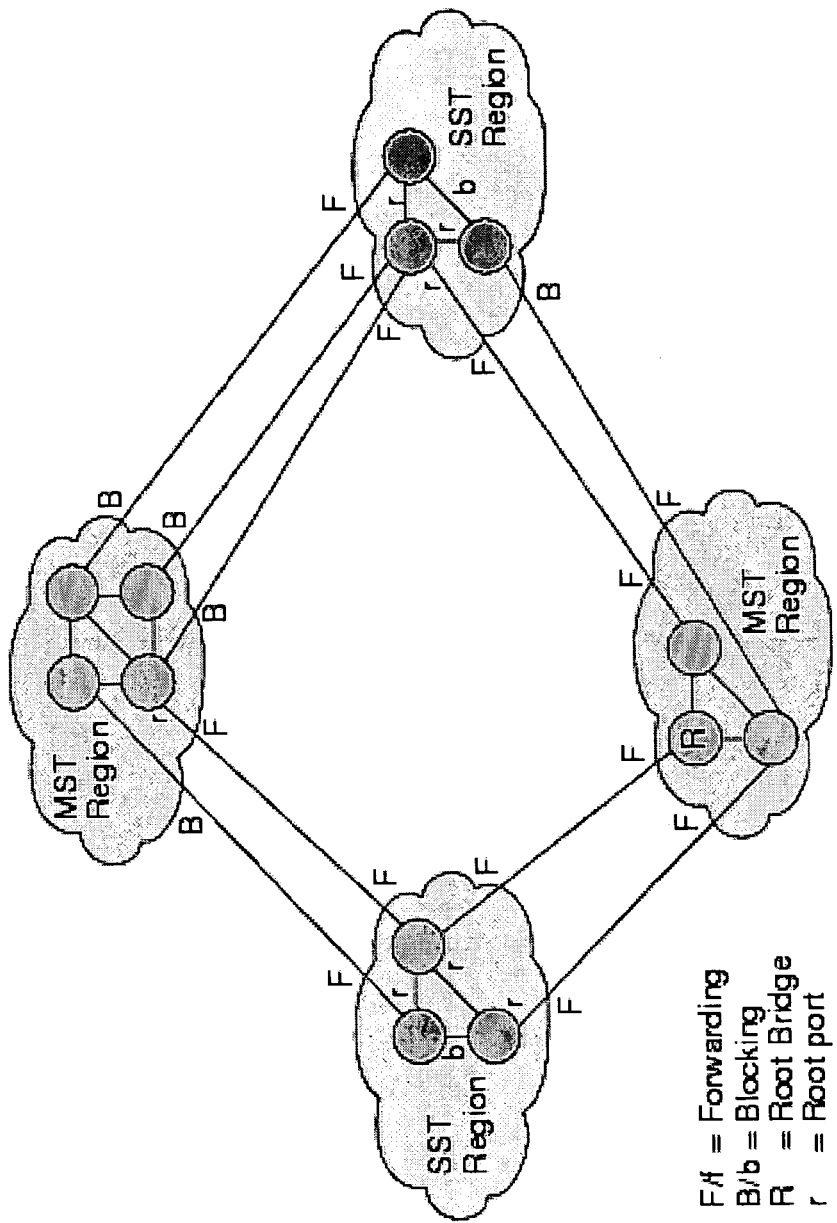
FIG. 1 is a flow diagram illustrating a network implementing a conventional mixed STP and MSTP topology.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the computer program for use by or in connection with the instruction execution system, apparatus, system or device. The computer readable medium can be, by way of example only but not by limitation, a-semiconductor system, apparatus, system, device, computer memory, or non-transitory storage medium. The computer readable medium may have suitable instructions for synchronously presenting multiple video program ID streams, such as on a display screen, or for providing for input or presenting in accordance with various embodiments of the present invention.

Figure 2:
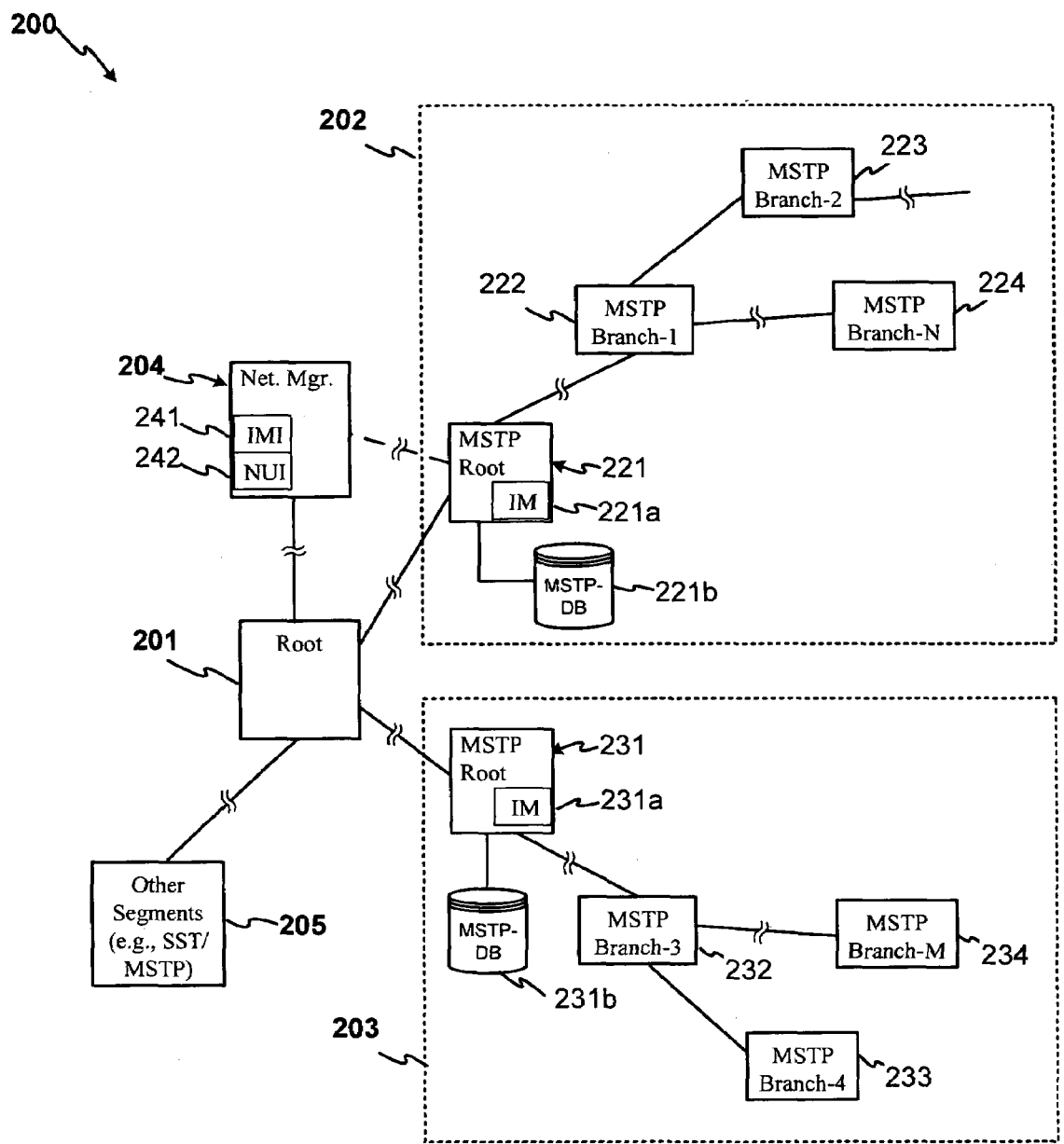
FIG. 2 is a schematic diagram illustrating a network implementing a topology instance merger according to an embodiment of the invention.

Referring now to FIG. 1 there is seen a flow diagram illustrating a network implementing a conventional mixed STP and MSTP topology. In FIG. 2, there is seen a flow diagram illustrating a network implementing a multiple instance topology 200 within which a topology instance merger 251 is operable according to an embodiment of the invention. Instance merger 251 is configurable for interoperating with substantially any multiple instance topology or topologies employing parallel topology instances that define respective data paths through a segmentable network portion. The multiple instance topology (or topologies) may further be implemented alone (e.g., across the entire network) or in conjunction with one or more further segmentable network portions employing one or more single instance topologies (e.g., SST), or one or more single instance per network segment topologies (e.g., IEEE 802.1s fully incorporated herein, along with IEEE 802.1 in general, by reference thereto).

(Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise. The term "parallel", as used herein, refers to topology instances in general, or of MSTP or other specific topology types that are included within the same common part, unless otherwise indicated or unless the context clearly dictates otherwise. As such, each parallel instance might correspond with the same or different participating stations within the same common part including but not limited to different participating station supersets, subsets, and so on, in accordance with the requirements of a particular application.)

Network 200 more specifically implements, in embodiments of the present invention, an extended LAN; and more particularly, an extended LAN employing IEEE 802.1s/Multiple Instance Spanning Tree Protocol (MISTP) in at least one segmentable portion or "common part" of extended LAN 200. A common part refers, for purposes of embodiments of the invention, to a user-selectable LAN portion including two or more stations employing parallel multiple topology instances of the same topology protocol. A common part may therefore also refer to an MSTP region or to some other portion of an MSTP region. Network 200 can also implement other network features, including but not limited to the Per-VLAN-Spanning Tree Protocol (PVST) or Rapid-Per-VLAN-Spanning Tree Protocol (rapid PVST or RPVST+) from Cisco Systems.

It will be appreciated that a multiple instance topology is implementable in a more centralized or distributed manner. A more centralized multiple STP topology implementation (e.g., MSTP) might, for example, utilize an MSTP-configuring computing system within a user definable MSTP region (e.g., MSTP root 221) or outside the region (e.g. network manager 204) to define successive mappings of corresponding successive MSTP instances. The mappings may, for example, be automatically generated by the MSTP-configuring computing system according to a user definable region and one or more of a wiring configuration of included stations and successive user modifications of STP/MSTP virtual network or station parameters (e.g., station priority, network depth, port cost, maximum aging timer, and so on). Mappings may also be generated by enabling user modification of one or more resulting MSTP instance configurations (e.g., enabled/blocked ports, enabled/disabled stations, and so on) or some combination of coupling, parameter modifications and resulting configuration modifications. In cases in which an MSTP-configuring computing system resides within an MSTP region, and therefore designation of a current MSTP-configuring computing system may change with respect to the MSTP region currently being defined, user modification may be provided via a coupling of a network manager that implements a user interface with the MSTP-configuring computing system within a current MSTP region. Ordinarily, the mappings might then be distributed to and stored by the affected (participating) stations within the MSTP region (e.g., via an exchange of bridge protocol data units or BPDUs). However, in accordance with embodiments of the present invention, parallel topology instance merge-ability determining, and any resulting topology instance merging, may be preferably conducted on the successive mappings prior to deployment of the MSTP instances. The resulting MSTP instances incorporating any topology instance merging that might be conducted may then be distributed to participating stations within the MSTP region, or each instance may be deployed as it is utilized in accordance with a particular MSTP implementation. As will be discussed in greater detail, merging operations (e.g., merge-ability determining or merging) may be conducted automatically (e.g., programmatically), or in conjunction with user intervention.

A more distributed multiple STP topology implementation might, for example, also provide for successive user interfacing via a computing system within a user definable MSTP region (e.g., MSTP root 221) or outside the region (e.g. network manager 204). In such cases, each multiple parallel topology instance might be generated via an exchange of BPDUs among participating stations within the MSTP region according to the MSTP implementation. In such cases, topology information including active/blocked port information for two or more (and preferably all) instances may be received by a fixed or designateable computing system in an otherwise conventional manner for transferring configuration data (e.g., via BPDUs, network management information or ordinary data packet transfer). Topology mappings of each of the respective MSTP instances may further be generated by the receiving computing system in an otherwise conventional manner for generating such mappings (e.g., in conjunction with network configuration features, diagnostics, error recovery, backup, security, and so on). In accordance with embodiments of the present invention, parallel topology instance merge-ability determining and any resulting merging may be preferably conducted by the receiving computing system (or some other coupled computing system to which the mapping is transferable) on each of the successive mappings. The computing system (merging system) may then, in one embodiment, deploy one or more merge indicators to the participating stations indicating instances that have been merged; the receiving stations may then implement corresponding merging. Alternatively, the merging system may similarly deploy to participating stations instance data incorporating any merging (e.g., via multicast or direct transfer of BPDUs, network management information or ordinary data packets). Merging operations (e.g., merge-ability determining or merging) may again be conducted automatically (e.g., programmatically), or in conjunction with user intervention in a similar manner, as with the above more centralized implementation example.

FIG. 2 more specifically illustrates an extended LAN 200 employing multiple topology types for different extended LAN segments, and in which examples of more centralized multiple parallel topology instance and merging system implementations may be employed. (For clarity sake, FIG. 2 illustrates extended LAN 200 following deployment of initial included topologies and topology instances.) Extended LAN 200 includes root 201, a first MSTP region (or "first network portion") 202, a second network portion 203, network manager 204 and other LAN segments 205.

Within extended LAN 200, root 201 couples extended LAN 200 segments including first network portion 202, second network portion 203 and other segments 205 in accordance with IEEE 802.1d, 802.1s, and further in accordance with the Cisco systems MISTP specification. First network portion 202 and second network portion 203 provide MSTP regions in which multiple parallel MSTP instances are to be deployed. First network portion 202 includes first MSTP root 221, branch station-1 222, branch station-2 223 and branch station-N 224. First MSTP root 221 further includes first instance merger 221a. Second network portion 203 includes second MSTP root 231, branch station-4 232, branch station-5 233 and branch station-M 234. Second MSTP root 231 further includes second instance merger 231a. Network manager 204 provides a user interface for enabling optional user intervention in conjunction with topology or merging operations. Finally, other LAN segments 205 is illustrative of other extended LAN segments that might be used, and that can include implementations of single STP (SST), multiple STP, other topologies or some combination thereof.

Operationally, first MSTP root 221 of first network portion 202 provides for determining and implementing an MSTP topology within first network portion 202 according to the MSTP specification. First MSTP root 221 responds to initiation by determining an initial MSTP instance mapping for an initial MSTP instance (instance-0) and storing the instance-0 mapping in MSTP database (MSTP-DB) 221b. First MSTP root 221 further responds to one or more successive MSTP parameter changes by determining further MSTP instance mappings for corresponding further MSTP instances (e.g., instance-1, instance-2, and so on, up to a maximum instance-15, according to the MSTP specification) and storing each MSTP instance mapping in MSTP-DB 221b. As was noted earlier, the MSTP specification permits MSTP parameter changes to be effectuated responsively to user input. In the present example, network manager 241 implements network management user interface (NUI) 241 in an otherwise conventional manner for receiving user input (e.g., parameter changes) and for providing feedback to the user (e.g., network mapping). NUI 241 transfers the user input to MSTP root 221, which implements corresponding network operations within first network portion 202 in accordance with the MSTP specification.

Preferably following the generation by MSTP root 221 of all MSTP instances corresponding to first network portion 202, MSTP root 221 initiates instance merger 221a. (We presume, for clarity sake, that no user intervention is yet conducted and MSTP root operation may be conducted automatically.) Instance merger 221a responds by retrieving from MSTP-DB 221b mappings corresponding to at least two MSTP instances and comparing the instances to determine if the instances are merge-able. (The retrieving and comparing may be conducted in accordance with instance numbering or otherwise in accordance with a particular application.) Thereafter, instance merger 221a continues retrieving from MSTP-DB 221b instance mappings corresponding to successive ones of MSTP instances corresponding to network portion 202 until instance merger 221a has compared each of the MSTP instances with all of the other MSTP instances. Instance merger 221a further mergers each set of two or more of the MSTP instances that instance merger 221a has found to be merge-able, and stores the merged instances in MSTP-DB 221b, replacing the MSTP instances that have been merged. Instance merger 221a further notifies first MSTP root 221 that merge operations are complete, and first MSTP root 221 retrieves from MSTP-DB 221b and deploys the resulting MSTP instances in accordance with the MSTP specification.

Instance merger 221a is also operable responsively to user intervention. User intervention is optional and may be utilized via a merger interface provided by instance merger interface 242 of network manager 204. (While network management operations might be implemented in a distributed manner, a single centralized network manager including network, single/multiple MSTP and merging operational interfaces may be preferably provided.) User intervention can, for example, include providing selectable user controls and feedback for enabling a user to initiate merging operations, inhibit merging operations, perform/inhibit merge-ability determining or merging on user-selectable ones of corresponding MSTP instances, providing user-notification(s) prior to determining/merging, retaining copies of MSTP instances that are later merged, and so on, or some combination, in accordance with the requirements of a particular application. MSTP-root 221 receives user input from instance merger interface 242 and provides indicators thereof to interface merger 221a, which correspondingly implements the user intervention operations. (It will be appreciated that user intervention with regard to network operations, merger operations or both may be provided or inhibited in accordance with user role, password protection or other security, according to the requirements of a particular application.)

Second MSTP root 231 of second network portion 203 preferably operates in substantially the same manner as with first MSTP root 221, but with reference to second network portion 203. Second MSTP root 221 provides for determining and implementing an MSTP topology within second network portion 203 according to the MSTP specification. Second MSTP root 231 responds to initiation by determining an initial MSTP instance mapping for an initial MSTP instance (instance-0), and storing the instance-0 mapping in MSTP database (MSTP-DB) 231b. Second MSTP root 231 further responds to one or more successive MSTP parameter changes by determining further MSTP instance mappings for corresponding further MSTP instances according to the MSTP specification, and storing each MSTP instance mapping in MSTP-DB 231b. In the present example, network manager 241 receives user input (e.g., parameter changes) and provides feedback to the user (e.g., network mapping). NUI 241 transfers the user input to second MSTP root 231, which implements corresponding network operations within second network portion 203 in accordance with the MSTP specification.

Preferably, following the generation by the second MSTP root 231 of all MSTP instances corresponding to second network portion 203, second MSTP root 231 initiates instance merger 231a. (We presume, for clarity sake, that no user intervention is yet conducted and MSTP root operation may be conducted automatically.) Instance merger 231a responds by retrieving from MSTP-DB 231b mappings corresponding to at least two MSTP instances and comparing the instances to determine if the instances are merge-able. (The retrieving and comparing may be conducted in accordance with instance numbering or otherwise in accordance with a particular application.) Thereafter, instance merger 231a continues retrieving from MSTP-DB 231b instance mappings corresponding to successive ones of MSTP instances corresponding to second network portion 203 until instance merger 231a has compared each of the MSTP instances with all of the other MSTP instances. Instance merger 231a further mergers each set of two or more of the MSTP instances that instance merger 231a has determined to be merge-able, and stores the merged instances in MSTP-DB 231b, replacing the MSTP instances that have been merged. Instance merger 231a further notifies second MSTP root 231 that merge operations are complete, and second MSTP root 231 retrieves from MSTP-DB 231b and deploys the resulting MSTP instances in accordance with the MSTP specification. Instance merger 231a is also preferably operable responsively to user intervention via instance merger interface 242 in the same manner as with instance merger 231b, but with respect to MSTP instances corresponding to second network portion 203.

Figure 3A:
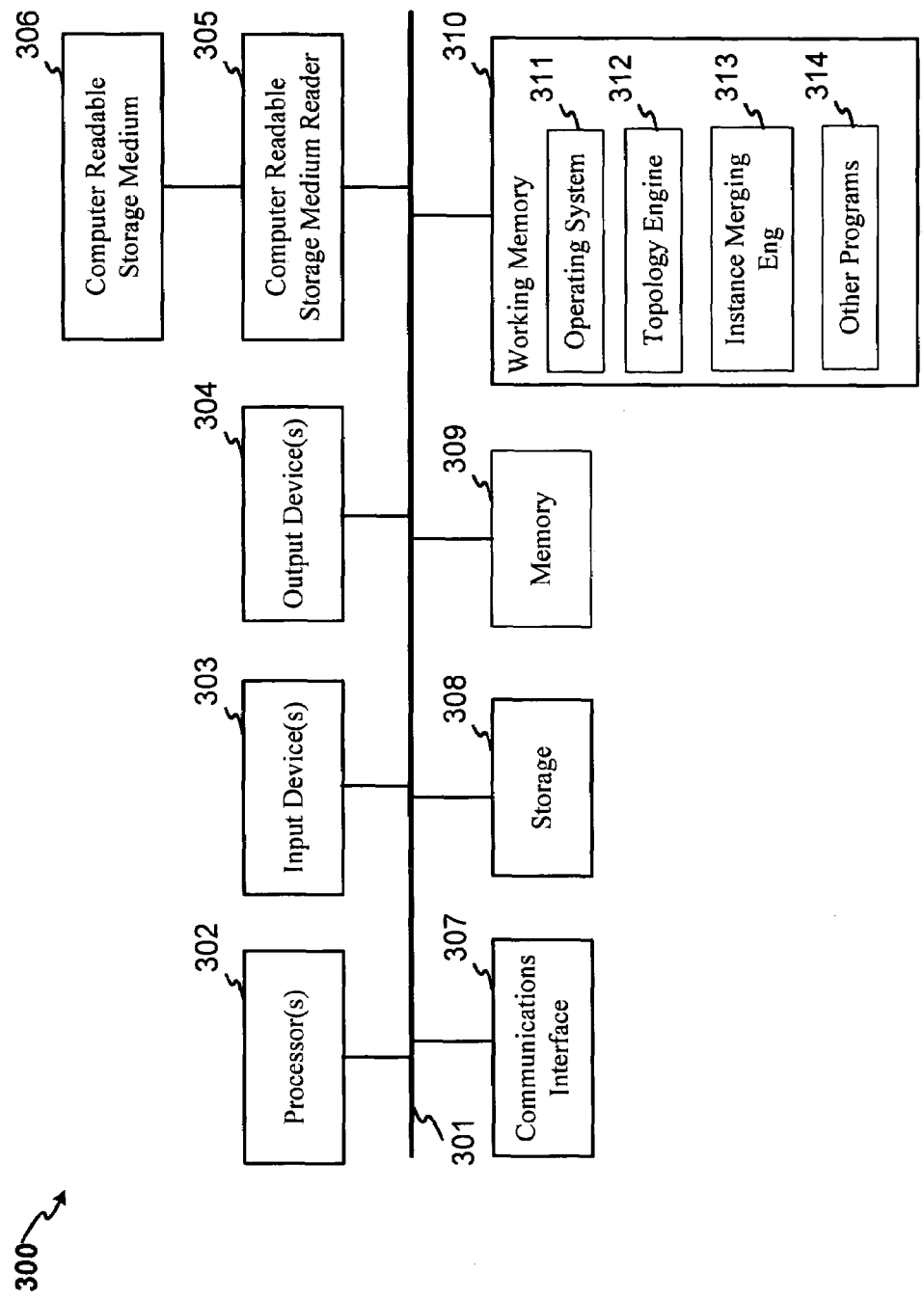
FIG. 3A is a flow diagram illustrating a computing system for implementing the determination of topology instance merge-ability according to an embodiment of the invention.
Figure 3B:
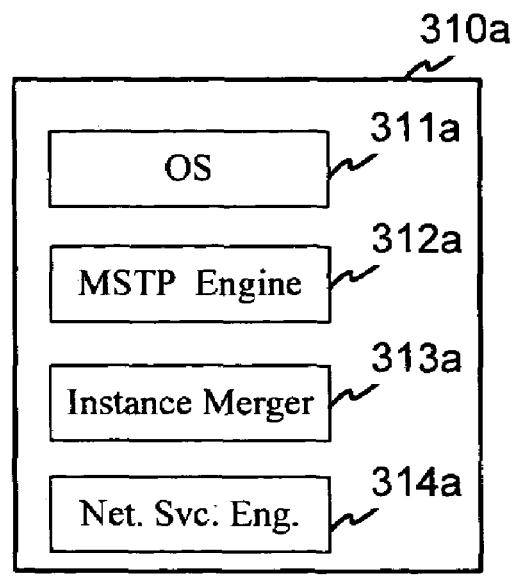
FIG. 3B is a flow diagram illustrating, in greater detail, a working memory configuration of the FIG. 3A computing system for implementing the determination of topology instance merge-ability according to an embodiment of the invention.
Figure 3C:
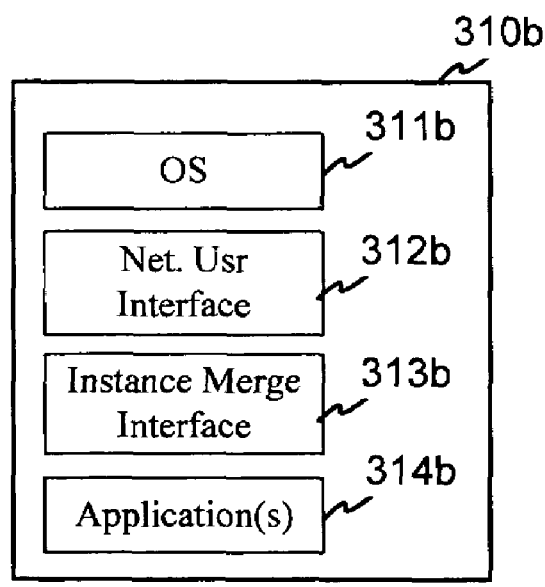
FIG. 3C is a flow diagram illustrating, in greater detail, a working memory configuration of the FIG. 3A computing system for implementing a topology instance merge-ability interface according to an embodiment of the invention.

Turning now to FIGS. 3A through 3C, an exemplary computing system is illustrated that may comprise one or more of the components of FIG. 2. While other alternatives might be utilized, it will be presumed for clarity sake that components of the systems of FIG. 2 and elsewhere herein are implemented in hardware, or some combination of software and hardware, by one or more computing systems consistent therewith, unless otherwise indicated.

Computing system 300 comprises components coupled via one or more communication channels (e.g. bus 301) including one or more general or special purpose processors 302, such as a Pentium®, Centrino®, Power PC®, digital signal processor ("DSP"), and so on. System 300 elements also include one or more input devices 303 (such as a mouse, keyboard, microphone, pen, and so on), and one or more output devices 304, such as a suitable display, speakers, actuators, and so on, in accordance with a particular application.

System 300 also includes a computer readable storage media reader 305 coupled to a computer readable storage medium 306, such as a storage/memory device or hard or removable storage/memory media; such devices or media are further indicated separately as storage 308 and memory 309, which can include hard disk variants, floppy/compact disk variants, digital versatile disk ("DVD") variants, smart cards, partially or fully hardened removable media, read only memory, random access memory, cache memory, and so on, in accordance with the requirements of a particular application. One or more suitable communication interfaces 307 may also be included, such as a modem, Ethernet or other suitable transceiver, and so on for providing inter-device communication directly or via one or more suitable private or public networks or other components that can include but are not limited to those already discussed. Communications interfaces 307 is further preferably configurable for operating in accordance with one or more of STP, MSTP or other topologies, in accordance with the requirements of a particular application.

Working memory 310 further includes operating system ("OS") 311 elements, network topology engine 312 and instance merging engine 313 (see FIGS. 3B and 3C below), as well as other programs 314 that might be used. Working memory components may also include one or more of application programs, mobile code, data, and so on for implementing system 200 elements that might be stored or loaded therein during use. The particular OS may vary in accordance with a particular device, features or other aspects in accordance with a particular application (e.g. Windows, WindowsCE, Mac, Linux, Unix or Palm OS variants, a cell phone OS, a proprietary OS, and so on). Various programming languages or other tools may also be utilized, such as those compatible with C variants (e.g., C++, C#), the Java 2 Platform, Enterprise Edition ("J2EE") or other programming languages in accordance with the requirements of a particular application. Such working memory components may, for example, include one or more of applications, add-ons, applets, custom software and so on for conducting but not limited to the examples discussed elsewhere herein. Other programs 314 may, for example, include one or more of the aforementioned security, compression, synchronization, backup systems, Web browsers, conferencing programs, education programs, groupware code, and so on, including but not limited to those discussed elsewhere herein.

When implemented in software (e.g. as an application program, object, agent, downloadable, servlet, and so on in whole or part), an MOH-enhanced communication system or other component may be communicated transitionally or more persistently from local or remote storage to memory (SRAM, cache memory, etc.) for execution, or another suitable mechanism may be utilized, and elements may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

FIG. 3B illustrates an example of working memory 310 of MSTP root 221 of FIG. 2 in greater detail. As shown, working memory 310a includes OS 311a, MSTP engine 312a, instance merger 313a and network service engine 314a. OS 311a provides operating system components as was already discussed with reference to FIG. 3A. MSTP engine 312a provides for the aforementioned responding to initiation by receiving user control indicators from an MSTP user interface or an instance merger interface, implementing MSTP (e.g., generating MSTP instance maps, deploying MSTP instances, and so on), initiating merger 313a and passing user control indicators from an instance merger interface. Network service engine 314a provides for responding to initiation, such as receipt of one or more data packets, by providing additional one or more network services in addition to MSTP and merging operations.

FIG. 3C illustrates an example of working memory 310 of network manager 304 of FIG. 2 in greater detail. In this example, working memory 310b includes the aforementioned operating system 311b (e.g., see FIG. 3A), network interface 312b (FIG. 2) instance merge interface 313b and other applications (e.g., interface management interface 241 of FIG. 2, conventional or other network management applications/interfaces).

Continuing now with FIGS. 4A through 4E, there are seen flow diagrams illustrating, in greater detail, topology instance merging embodiments according to the invention.

Figure 4A:
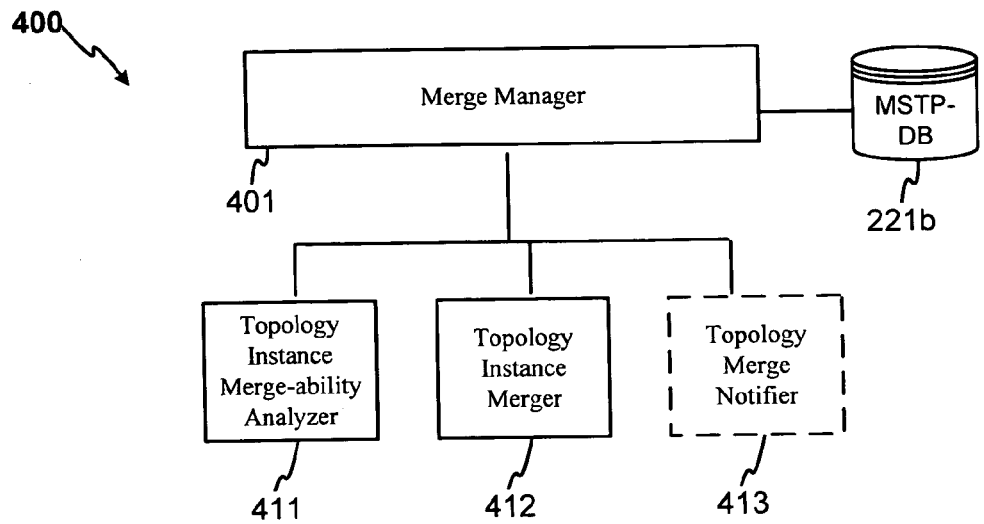
FIG. 4A is a flow diagram illustrating, in greater detail, a topology instance merger according to an embodiment of the invention.

FIG. 4A illustrates an exemplary topology instance merging system including merge manager 401, topology instance merge-ability analyzer (TIMA) 411, topology instance merger 412, topology merge notifier 413 and MSTP database (MSTP-DB) 221*b*. Merge manager 401 responds to initiation by a hosting computing system (e.g., MSTP root 221 of FIG. 2) by retrieving from MSTP-DB 221 successive topology instances for which merge-ability is to be determined and for initiating and providing to TIMA 411 the topology instances. TIMA 411 provides for determining whether two or more of the topology instances are merge-able, and if so, for initiating topology instance merger 412 for merging the merge-able topology instances. Topology instance merger 412 provides for receiving two or more topology instances, merging the topology instances and storing resulting merged topology instances in MSTP-DB 221*b*, thereby either replacing the un-merged instances with a resulting merged instance or first storing a copy of the un-merged instances (e.g., see above). Topology instance merger 412 more specifically provides for replacing a merge-able topology instances with a topology instance that forms a superset of both topology instances, for example, one of the received topology instances or a new, representative topology instance. Topology merge notifier 413 provides, in a more distributed MSTP implementation, for providing to a participating station already storing topology instances that have later been merged, a topology instance merge indicator indicating such merging or corresponding merged topology instance data (e.g., see FIG. 2).

Figure 4B:
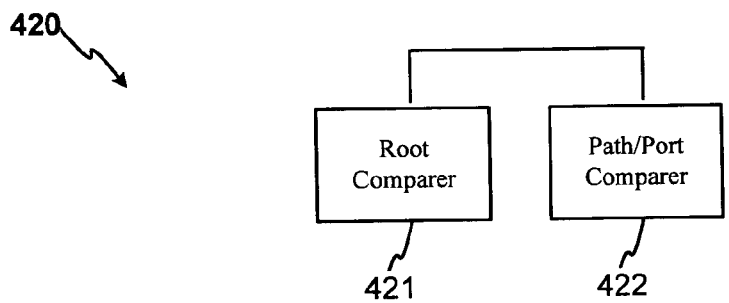
FIG. 4B is a flow diagram illustrating a topology instance merge-ability analyzer according to an embodiment of the invention.
Figure 4C:
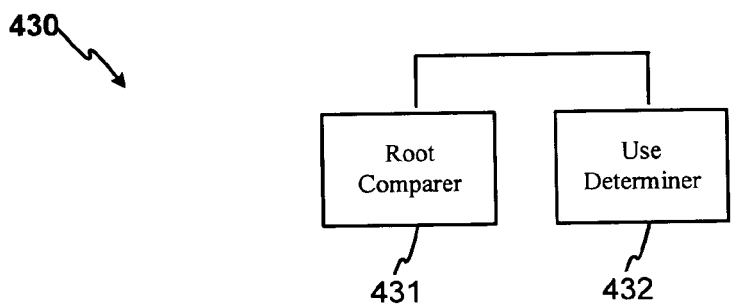
FIG. 4C is a flow diagram illustrating a further topology instance merge-ability analyzer according to an embodiment of the invention.

FIGS. 4B and 4C illustrate embodiments of TIMA 411 of FIG. 4A in greater detail. Beginning with FIG. 4B, TIMA 420 includes root comparer 421 and path/port comparer 422. Root comparer 421 provides for determining whether two or more topology instances have the same root port. Path/port comparer 422 provides for determining whether the two or more topology instances provide the same forwarding path and are thus conditionally merge-able. TIMA 420 thus determines, if the topology instances have the same root port and the topology instances are conditionally merge-able, that the topology instances are merge-able. The TIMA embodiment of FIG. 4C includes root comparer 431 and use determiner 432. Root comparer provides for determining whether two or more topology instances have the same root port. Use determiner 432 determines whether one or more of the topology instances will not be used and are therefore conditionally merge-able. TIMA 430 thus determines, if the topology instances have the same root port and the topology instances are conditionally merge-able, that the topology instances that will not be used are merge-able into the remaining topology instance that will be used.

Figure 4D:
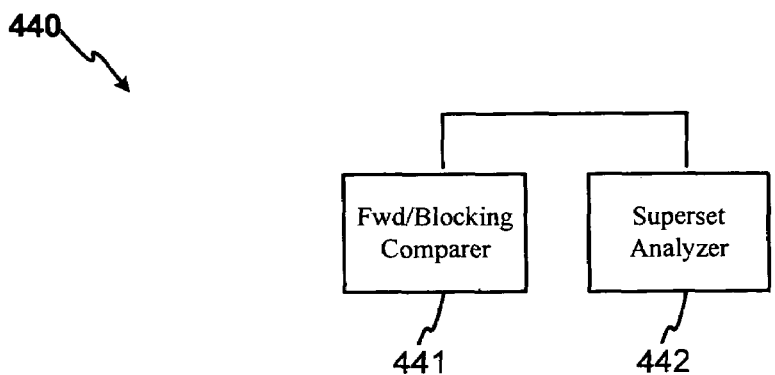
FIG. 4D is a flow diagram illustrating a conditional merge-ability analyzer according to an embodiment of the invention.
Figure 4E:
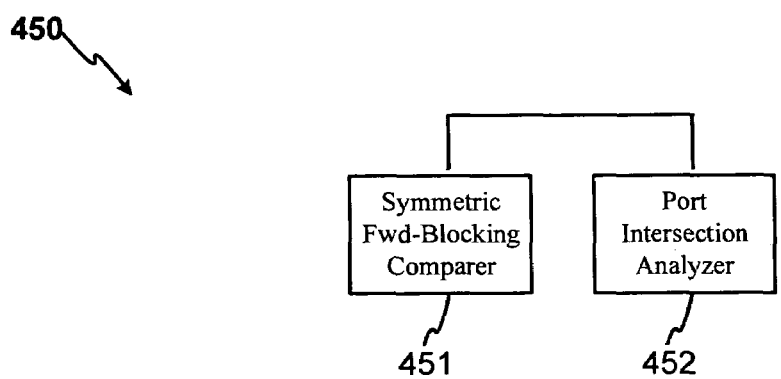
FIG. 4E is a flow diagram illustrating a further conditional merge-ability analyzer according to an embodiment of the invention.

FIGS. 4D and 4E illustrate embodiments of systems for determining whether two or more topology instances are conditionally merge-able. The conditional merge-ability or sub-tree reduction determining system 440 of FIG. 4D includes forwarding/blocking comparer 441 and superset analyzer 442. Forwarding/blocking comparer 441 provides for comparing two or more topology instances to determine whether the topology instances have: (1) the same ports in a forwarding state or "forwarding ports", or (2) the same ports in a blocking state or "blocking ports". Superset analyzer 422 provides for comparing the two or more topology instances to determine whether one of the topology instances is a superset of one or more of the remaining topology instances. System 440 thus determines, if the topology instances have the same forwarding ports or the same blocking ports and further that one of the topology instances (superset instance) is a superset of the remaining topology instances (subset instances), that the subset instances are conditionally merge-able into the superset instance.

The conditional merge-ability or conditional reduction system 450 of FIG. 4E includes symmetric forwarding-blocking comparer 451 and port intersection analyzer 452. Symmetric forwarding-blocking comparer 451 provides for determining a forwarding symmetric difference between a first forwarding link set including all forwarding ports (or "links") of a first topology instance and a second forwarding link set including all forwarding links of a second topology. Symmetric forwarding-blocking comparer 451 further provides for determining a blocking symmetric difference between a first forwarding link set including all blocking ports (or "links") of a first topology instance and a second blocking link set including all blocking links of a second topology, and for providing the differences to intersection analyzer 452. Intersection analyzer 452 provides for determining, if an intersection between the forwarding symmetric difference and the blocking symmetric difference includes 0 elements (i.e., is empty), that the two topology instances are merge-able.

It should be understood that the sub-tree reduction system 440 of FIG. 4D is non-symmetric while the conditional reduction system 450 of FIG. 4E is symmetric. As a result, system 440 provides for determining, if a first topology instance is conditionally merge-able with a second topology instance, and is also conditionally merge-able with a third topology instance (or further topology instances), that the second and third (or further) topology instances are conditionally merge-able with the first topology instance. Contrastingly, system 450 requires, for conditional merge-ability with a first topology instance, that each topology instance be determined to be conditionally merge-able with each of the other topology instances. Thus, for example, system 450 must determine that a first topology instance is conditionally merge-able with a second topology instance and a third topology instance, and further that the second topology instance is conditionally merge-able with the third topology instance to produce a determination that that second topology instance and the third topology instance are conditionally merge-able with the first topology instance.

Figure 5:
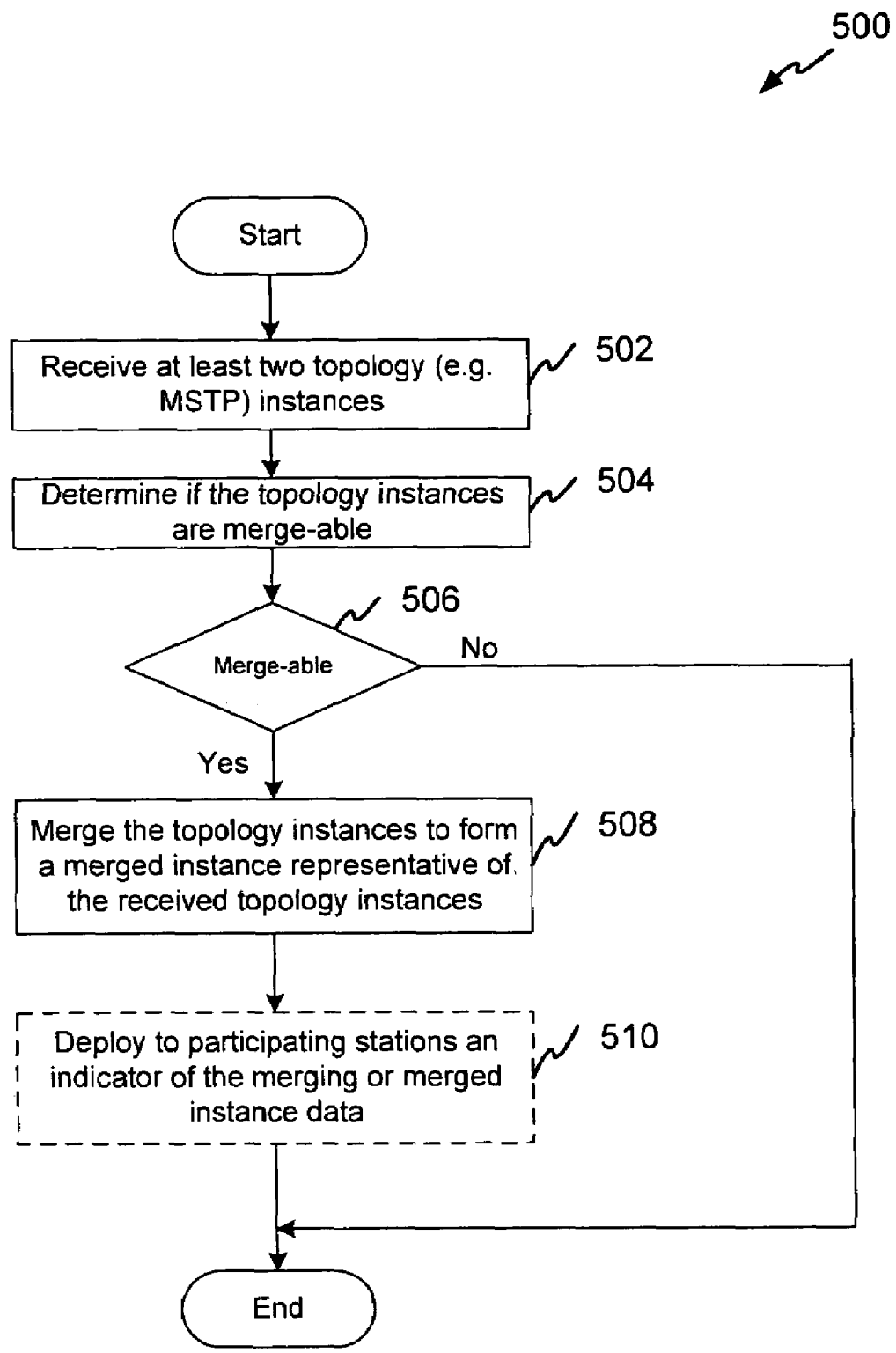
FIG. 5 is a flowchart illustrating a topology instance reduction method according to an embodiment of the invention.

Turning now to FIG. 5, there is seen a flowchart illustrating a topology instance reduction method according to an embodiment of the invention. In block 502, an instance merger receives at least two topology instances (e.g., parallel MSTP instances) corresponding to a same common part of a network employing the topology. In block 504, the instance merger determines if the topology instances are merge-able. If, in block 506, the instance merger determines that the topology instances are not merge-able, then the method ends; if instead, in block 506, the instance merger determines that the topology instances are merge-able, then the method continues with block 508. In block 508, the instance merger merges the topology instances to form a merged instance representative of the received topology instances. Block 510, which can, for example, be employed in a distributed implementation in which the instances have already been deployed, provides for the instance merger deploying the merged instance data or an indicator of the merging of the instances to participating stations.

Figure 6:
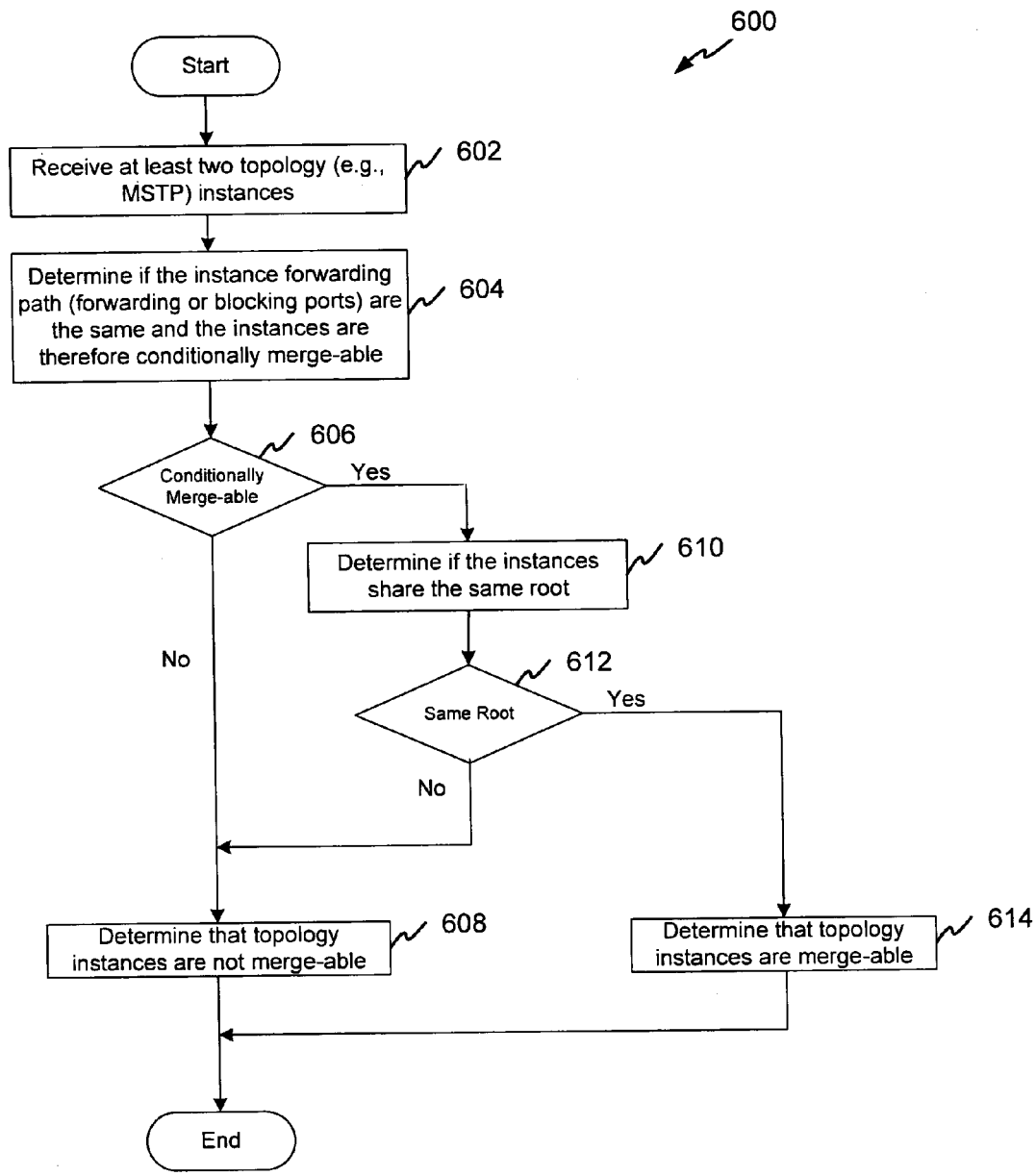
FIG. 6 is a flowchart illustrating a method for determining whether two or more parallel topology instances are merge-able according to an embodiment of the invention.

Continuing with FIG. 6, there is seen a flowchart illustrating a method for determining whether two or more parallel topology instances are merge-able according to an embodiment of the invention. In block 602, an instance merger receives at least two topology instances (e.g., parallel MSTP instances) corresponding to a same common part of a network employing the topology. In block 604, the instance merger determines if the forwarding paths (e.g., forwarding or blocking port states) are the same and the instances are therefore conditionally merge-able. If, in block 606, the instances are not conditionally merge-able, then the instance merger determines that the topology instances are not merge-able in step 608. If instead, in block 606, the instance merger determines that the instances are conditionally merge-able, then the method proceeds at block 610. In block 610, the instance merger determines if the instances share the same topology root. If, in block 612, the instance merger determines that the instances do not have the same topology root, then the instance merger determines that the instances are not merge-able in step 608. If instead, in block 612, the instance merger determines that the instances share the same topology root, then the instance merger determines that the topology instances are merge-able in step 614.

Figure 7:
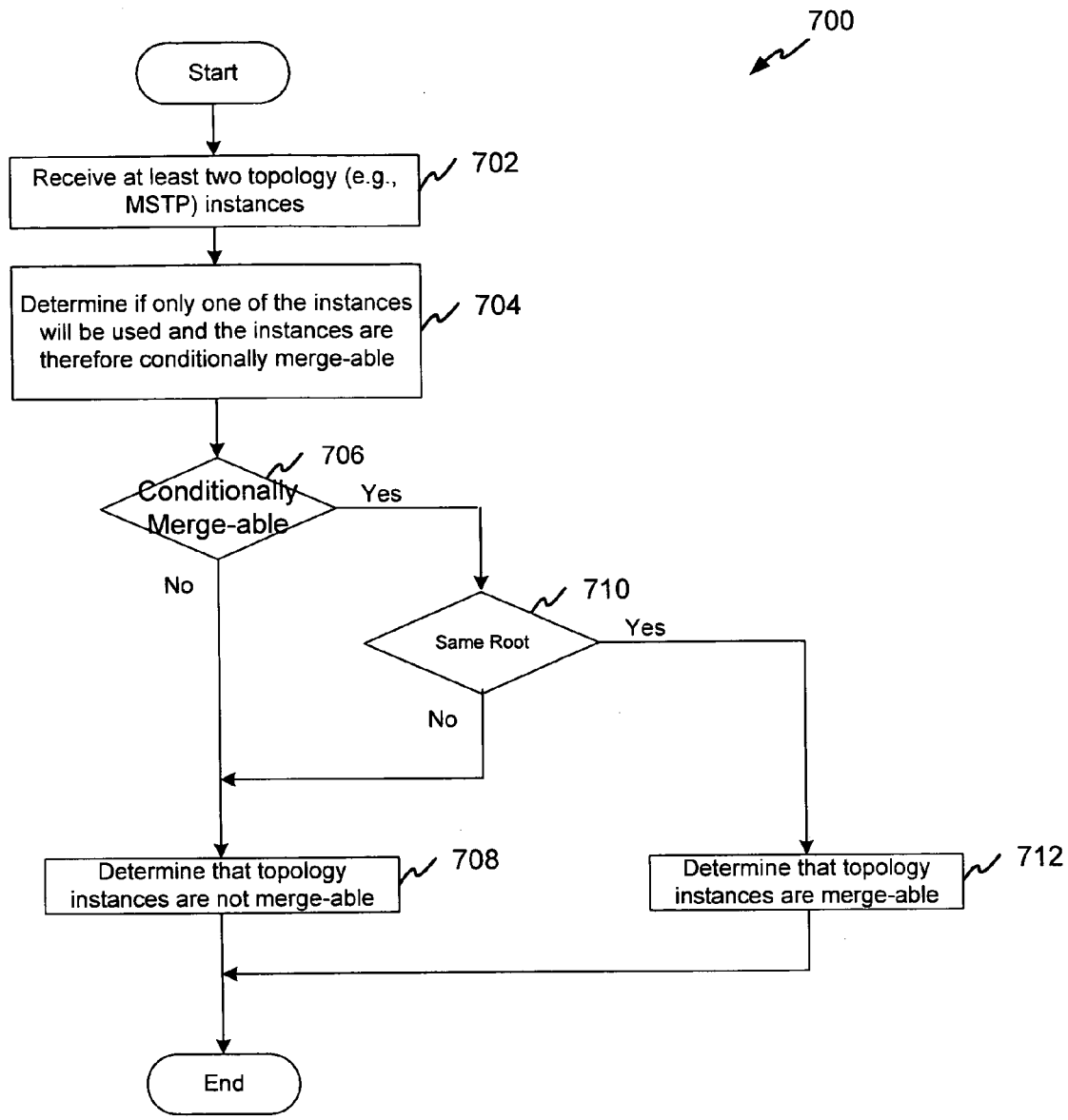
FIG. 7 is a flowchart illustrating a further method for determining whether two or more parallel topology instances are merge-able according to an embodiment of the invention.

Continuing now with FIG. 7, there is seen a further method for determining whether two or more parallel topology instances are merge-able according to an embodiment of the invention. In block 702, an instance merger receives at least two topology instances (e.g., parallel MSTP instances) corresponding to a same common part of a network employing the topology. In block 704, the instance merger determines if only one of the instances will be used and the instances are therefore conditionally merge-able. If, in block 706, the instances are not conditionally merge-able, then the instance merger determines that the topology instances are not merge-able in step 708. If instead, in block 706, the instance merger determines that the instances are conditionally merge-able, then the method proceeds at block 710. In block 710, the instance merger determines if the instances share the same topology root. If, in block 712, the instance merger determines that the instances do not have the same topology root, then the instance merger determines that the instances are not merge-able in step 708. If instead, in block 712, the instance merger determines that the instances share the same topology root, then the instance merger determines that the topology instances are merge-able in step 714.

Figure 8:
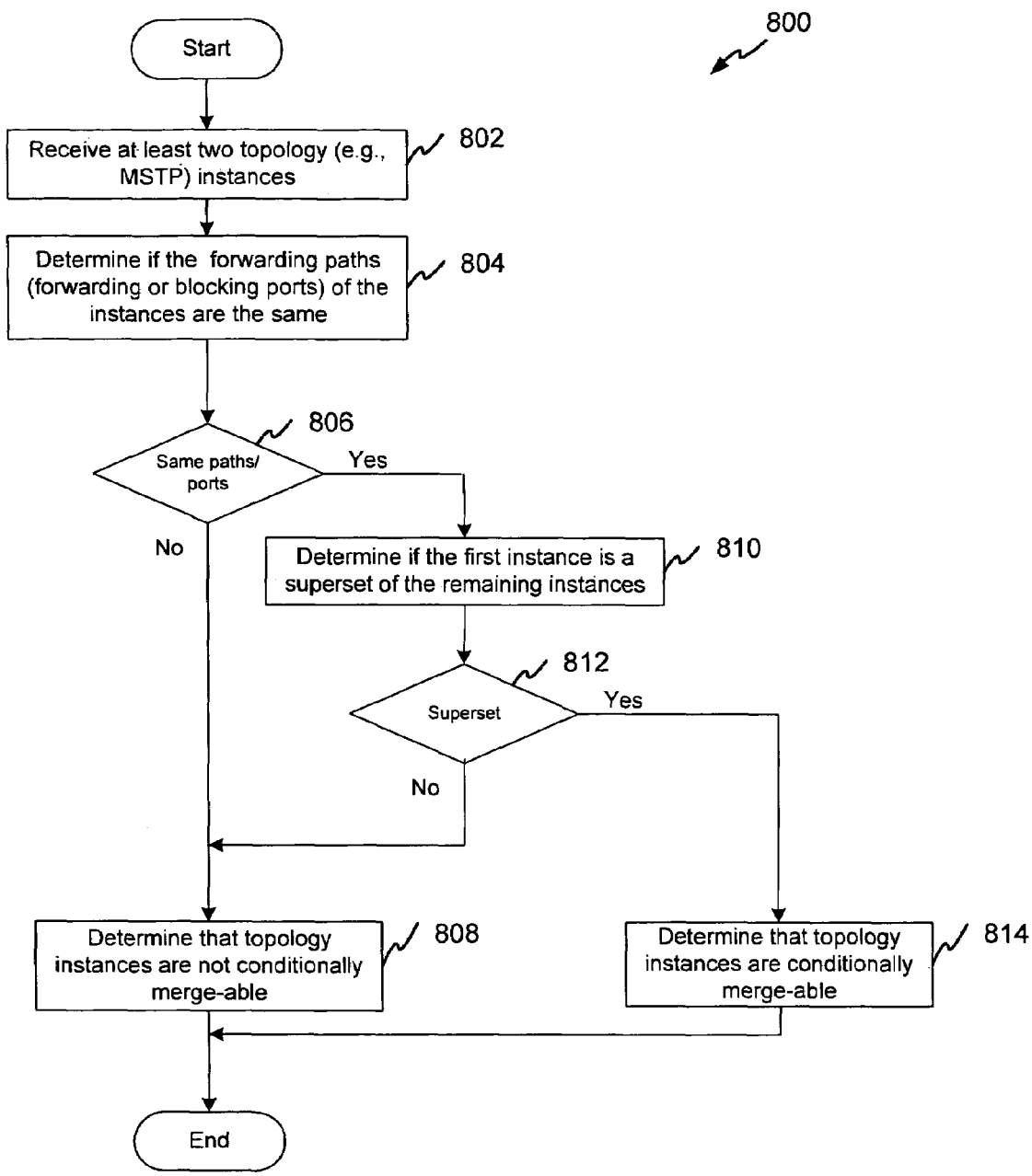
FIG. 8 is a flowchart illustrating a method for determining whether two or more parallel topology instances are conditionally merge-able according to an embodiment of the invention.

Continuing with FIG. 8, there is seen a subtree reduction method for determining whether two or more parallel topology instances are conditionally merge-able according to an embodiment of the invention. In block 802, an instance merger receives at least two topology instances (e.g., parallel MSTP instances) corresponding to a same common part (subtree) of a network employing the topology. In block 804, the instance merger determines if the forwarding paths (forwarding or blocking ports) of the instances are the same. If, in block 806, the forwarding paths of the instances are not the same, then the instance merger determines that the topology instances are not conditionally merge-able in step 808. If instead, in block 806, the instance merger determines that the forwarding paths of the instances are the same, then the method proceeds at block 810. In block 810, the instance merger determines if a first instance of the instances is a superset of the remaining instances. If, in block 812, the instance merger determines that the first instance is not a superset of the remaining instances, then the instance merger determines that the instances are not conditionally merge-able in step 808. If instead, in block 812, the instance merger determines that the first instance is a superset of the remaining instances, then the instance merger determines that the topology instances are conditionally merge-able in step 814.

Figure 9:
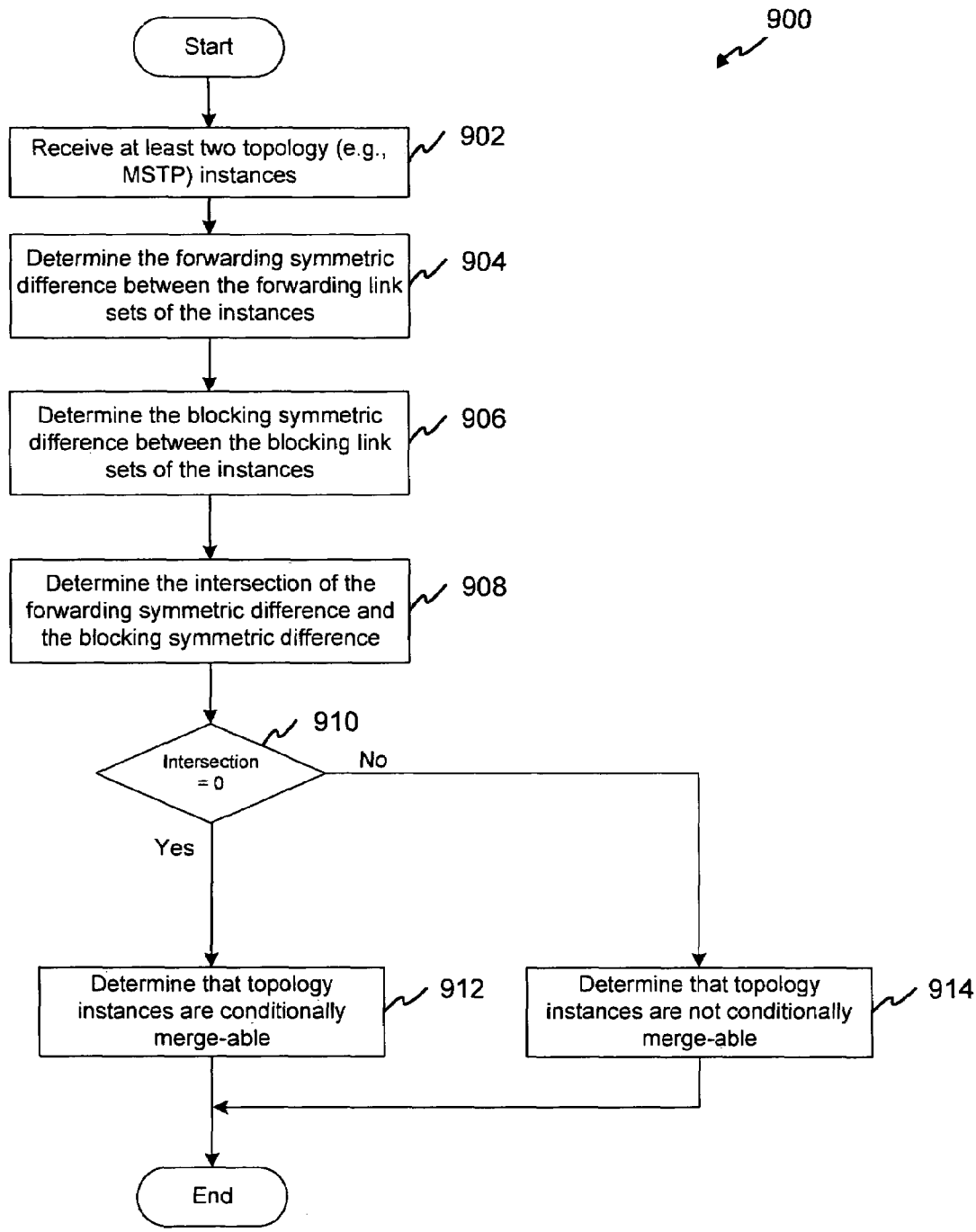
FIG. 9 is a flowchart illustrating a further method for determining whether two or more parallel topology instances are conditionally merge-able according to an embodiment of the invention.

FIG. 9 illustrates a conditional reduction method for determining whether two parallel topology instances are conditionally merge-able according to an embodiment of the invention. In block 902, an instance merger receives two topology instances (e.g., parallel MSTP instances) corresponding to a same common part (subtree) of a network employing the topology. In block 904, the instance merger determines a forwarding symmetric difference between forwarding link sets of the received instances. In block 906, the instance merger determines a blocking symmetric difference between the blocking link sets of the received instances. In block 908, the instance merger determines an intersection of the forwarding symmetric difference and the blocking symmetric difference. If, in block 910, the instance merger determines that the intersection is empty, then the instance merger determines that the received instances are conditionally merge-able in step 912. If instead, in block 910, the instance merger determines that intersection is not empty (e.g., includes at least one element), then the instance merger determines that the received instances are not conditionally merge-able in step 914.

In additional embodiments of the present invention any station with topology intelligence (e.g., NMS) may compute optimal spanning tree roots using one or more of the following ways: (i) least depth; (ii) least cost; and (iii) traffic flows.

Figure 10:
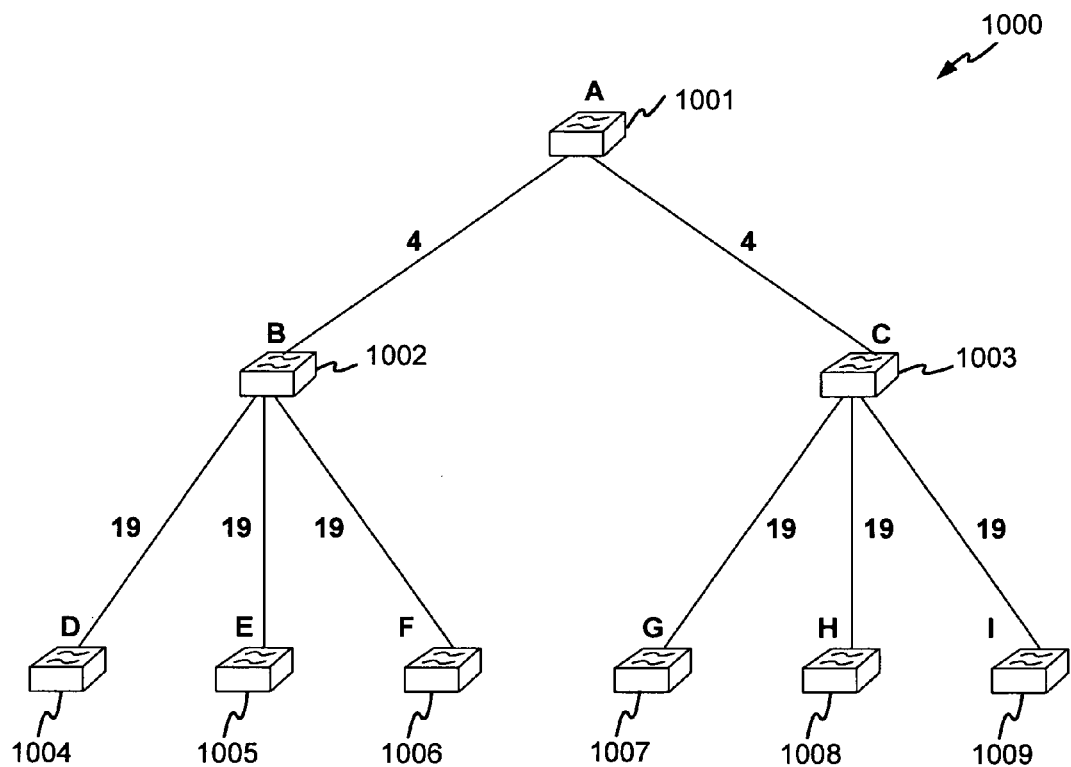
FIG. 10 is a detail diagram for algorithm computation for least depth way for determining an optimal spanning tree root.

For the least depth way to determine an optimal spanning tree root, the node with the least path cost to boundary nodes is recommended as root per this method. When the spanning tree root is computed based on this method, it provides better overall convergence, particularly convergence time which is based on the distance to the boundary nodes. A device with higher distance to boundary nodes will take more time to propagate the topology change that has occurred than another node in the same switched environment with lesser distance. This directly affects the convergence time of the switched/bridged network. Once this root is chosen, suitable adjustment may be made to forward delay timer of spanning tree protocol to take advantage of faster convergence. In implementing the algorithm for the least depth and as best illustrated in FIG. 10, every node is taken as the pivot node and the distance to boundary nodes is computed, along with the distance to each of the boundary nodes. The highest distance among the computed distances to each of the boundary nodes is determined. Subsequently, the node with the least value for highest boundary node distance is determined for discovering a possible spanning tree root. For example as shown in Table 1 below in association with FIG. 10, A is the optimal root because the least max depth node is A.

TABLE 1

| Max Depth for each of the nodes: |
| --- |
| Max Depth for A—Depth of (A-B-D) = 23 |
| Max Depth for B—Depth of (B-A-C-G) = 27 |
| Max Depth for C—Depth of (C-A-B-D) = 27 |
| Max Depth for D—Depth of (D-B-A-C-G) = 46 |
| Max Depth for E—Depth of (E-B-A-C-G) = 46 |
| Max Depth for F—Depth of (F-B-A-C-G) = 46 |
| Max Depth for G—Depth of (G-C-A-B-D) = 46 |
| Max Depth for H—Depth of (H-C-A-B-D) = 46 |
| Max Depth for I—Depth of (H-C-A-B-D) = 46 |

Figure 11:
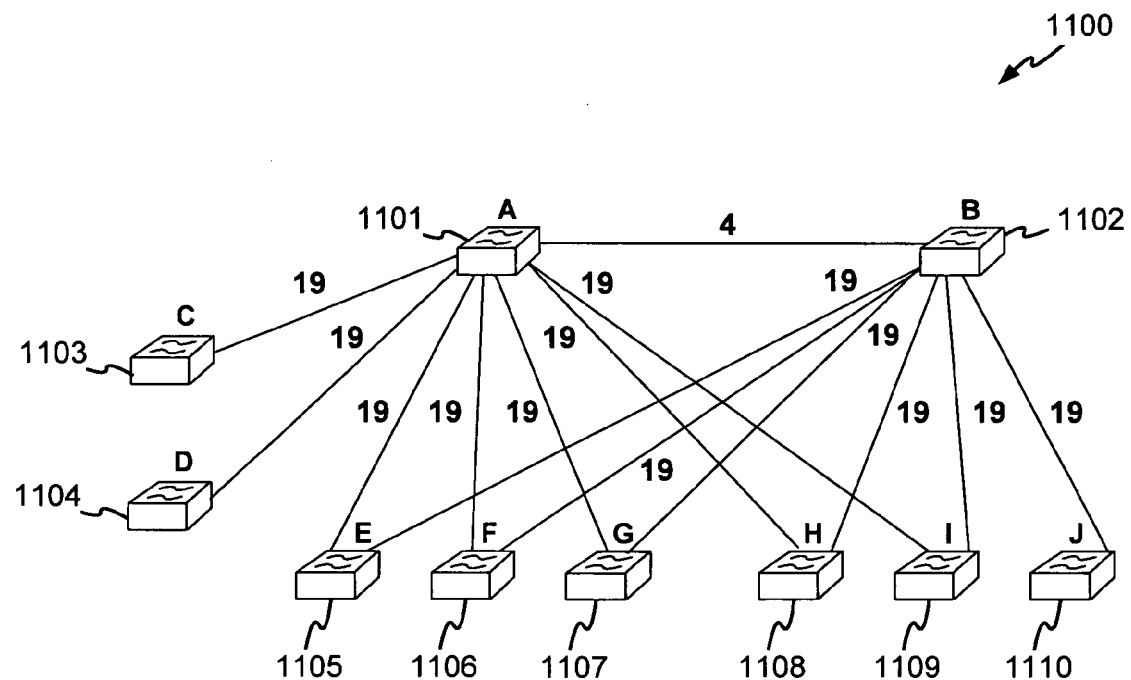
FIG. 11 is a detail diagram for algorithm computation for least cost way for determining an optimal spanning tree root.

For the least cost way to determine an optimal spanning tree root, the node with the least cumulative cost to all other nodes is recommended as root per this method. When the spanning tree root is computed based on this method, it provides better path between nodes in the switched environment assuming equal traffic distributions. In case of unbalanced switched environment where core switch 'A' is connected to 10 other distribution switches and another core switch 'B' is connected to only 5 of the distribution switches this algorithm will suggest 'A' as root as compared to 'B'. Five switches which are not directly connected to 'B' should take a longer path to other nodes if 'B' is selected as root where as when 'A' is selected as root this problem could be avoided. In implementing the algorithm for the least cost and as best illustrated in FIG. 11, every node in the switched environment is taken as the pivot node and the shortest path cost is computed from this pivot node to all other nodes. Subsequently, the cumulative cost is determined by adding up all shortest path costs for this pivot node. After computing the cumulative path cost for all nodes, the node with the least cumulative cost is determined for discovering a possible spanning tree root. For example, as shown in Table 2 below in association with FIG. 11, A is the optimal root because the minimum cumulative path cost is for A. In this case, there is a need to check network connectivity balancing, and just least depth will not help. For this scenario, a cumulative path cost metric algorithm can help. Cumulative path cost is the sum of path costs of paths from a current node to all other nodes.

TABLE 2

Cumulative path cost for various nodes:

A—19 + 19 + 19 + 19 + 19 + 19 + 19 + 23(J) + 4 = 160
B—19 + 19 + 19 + 19 + 19 + 19 + 23(C) + 23(D) + 4 = 164
For all other nodes:

Cost to reach A = 19, for J to reach A cost = 23
Cost to reach B = 19, for C and D cost to reach B = 23
Cost to reach any other node = 19 + 19, from C and D to J cost = 42
For E, F, G, H, I the cumulative path cost is 304
For C and D the cumulative path cost is 312
For J the cumulative path cost is 316

For the traffic flow way to determine an optimal spanning tree root, in a switched/bridged environment, when spanning tree is computed the primary aim is to eliminate loops. This may not necessarily provide the shortest possible path between every node to every other node. Based on the traffic pattern a particular device may provide optimal path for a greater percentage of traffic than another. By way of example only, assume a switched network contains nodes—{A, B, C, D and E}. An overall traffic of 95% is localized between a set of nodes {A, B, and C} then a node which when selected as root provides the shortest path between A, B and C would be the ideal choice no matter whether it provides shortest path from D or E to any other nodes. In some cases one may not be able to obtain the shortest path between A, B and C when trying to find optimal root. In such cases, a root which provides most optimal path between A, B and C would be chosen. In implementing the algorithm for the traffic flow, every node in the switched environment is taken as the pivot node and the forwarding topology is computed from this pivot node to all other nodes. Subsequently, for a given traffic flow (from external application like netflow), the path traversed is found along with the cost involved which may be assumed to be 'tcost'. Next the shortest path corresponding to the end nodes of the traffic flow is determined, and this is assumed to be 'scost'. Assume that the traffic flow contribute is 'x' bps. A metric of sub-optimality is (scost−tcost)*x. The sub-optimality metric for all traffic flows for the current root is computed, along with the cumulative sub-optimality involved. After computing the cumulative sub-optimality, the node with the least cumulative sub-optimality may be considered a good candidate for a spanning tree root.

In additional embodiments of the present invention, any station with topology intelligence (e.g., NMS) may derive a measure of network redundancy and use it to further compute the maximum number of instances that can be run on a switched environment. The optimal number of instances that can be run for given network redundancy may be determined by initially computing the number of independent redundant paths available between a set of nodes in the switched network, and subsequently computing the mappings based on the optimal number of instances for optimizing switch's CPU/memory resources, or on the optimal number of instances for better link utilization.

The number of independent redundant paths available between a set of nodes in the switched network may be computed as follows. For every set of nodes, note down or submit the available number of redundant paths in REDUNDANT_PATH_MAP. By way of example, between {A, B} if there are 3 redundant paths available then create the following mapping in REDUNDANT_PATH_MAP: {A, B}=<3. Only the set of nodes with more than 1 path between them are considered in this mapping, and the set of nodes with only one path between them will be eliminated in this step.

Independent redundancy means that the resources (in this case ports) involved in this path is not shared by any other redundant path that is taken for computation. There may be two (2) cases of redundancy, one is redundancy between directly connected nodes and another is redundancy between indirectly connected nodes. Both these are taken into consideration. To simplify computation of number of redundant paths, only redundant paths with equal path cost or redundant paths falling in the range of predefined variance are selected.

Figure 12:
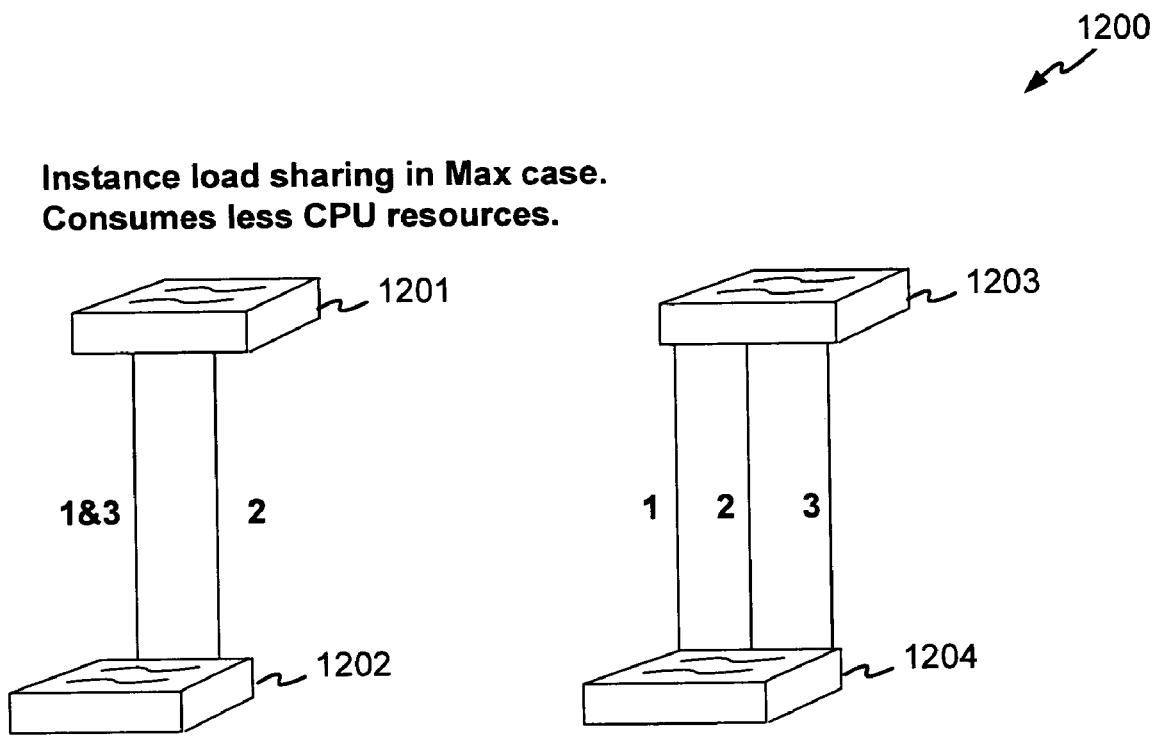
FIG. 12 is a diagramatic representation for optimizing switch's CPU/memory resources.
Figure 13:
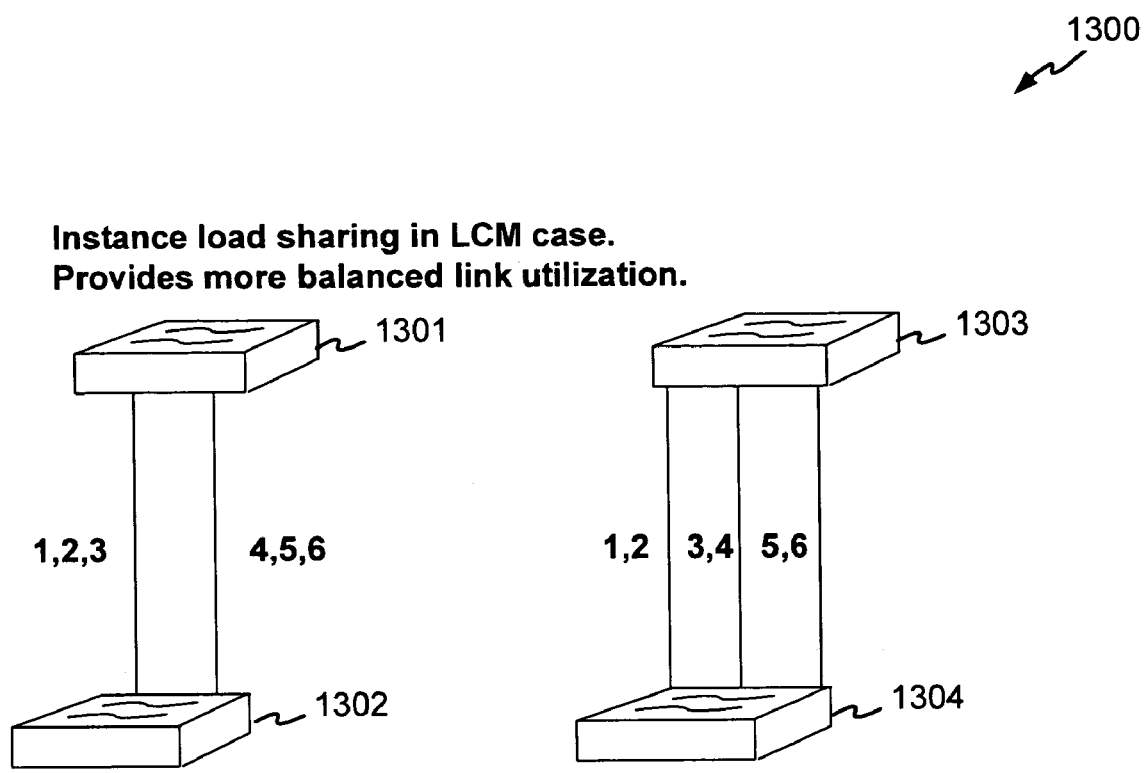
FIG. 13 is a diagramatic representation for providing better link utilization.

As previously indicated, after all the independent paths are computed, the mappings are then computed based on the optimal number of instances for optimizing switch's CPU/memory resources, or on the optimal number of instances for better link utilization. As best illustrated in FIG. 12, which is a diagramatic representation for optimizing switch's CPU/memory resources, the maximum number of independent redundant paths can be directly treated as the number of instances that can be run on the network, for optimizing switch's CPU/memory resources. With respect to the optimal number of instances for better link utilization, for each set of nodes the corresponding number of independent redundant paths id added to another REDUNDANT_PATH_SET, and the least common multiplier (LCM) of the number available in REDUNDANT_PATH_SET provides the number of instances that can be run to better utilize the links, as best illustrated in FIG. 13 which is a diagramatic representation for providing better link utilization.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for reducing spanning tree instances in a network, the method comprising:
   receiving in an instance merger of a network device on the network, first and second spanning tree instances corresponding to a portion of the network, the network having a plurality of participating stations;
   determining an optimal root for each of the first and second spanning tree instances;
   accessing configuration information from each of the first and second spanning tree instances, wherein the configuration information comprises a forwarding port, a blocked port, and the optimal root;
   comparing the configuration information accessed from the first and second spanning tree instances to determine whether the first and second spanning tree instances are merge-able, the merge-able determination implementing a subtree reduction comprising:
      determining if at least one of a forwarding port set and a blocking port set of each of the first and second spanning tree instances are substantially equivalent;
      determining if one of the first and second spanning tree instances is a superset of remaining spanning tree instances; and
   determining, if at least one of a forwarding port set and a blocking port set of each of the first and second spanning tree instances are substantially equivalent and if one of the first and second spanning tree instances is a superset of remaining spanning tree instances, that the first and second spanning tree instances are conditionally merge-able;
   merging the first and second spanning tree instances into a merged topology instance when the merge-able determination indicates that the first and second spanning tree instances are merge-able; and
   deploying one or more merge indicators to the plurality of participating stations to indicate that the first and second spanning tree instances have been merged into the merged topology instance, the one or more merge indicators being used by the participating stations to perform a corresponding merging of the first and second spanning tree instances.

2. The method of claim 1, wherein at least one of the spanning tree instances comprises an IEEE 802.1s multiple spanning tree protocol (MSTP) topology.

3. The method of claim 1, wherein at least one of the spanning tree instances comprises a spanning tree topology in accordance with at least one of IEEE 802.1s and Multiple Instance Spanning Tree Protocol (MISTP).

4. The method of claim 1, wherein the merge-able determination comprises:
   determining if an instance forwarding path of the first and second spanning tree instances are the same, thereby indicating that the first and second spanning tree instances are conditionally merge-able;
   determining if the first and second spanning tree instances share a common multiple instance root; and
   determining, if the first and second spanning tree instances are conditionally merge-able and share a common multiple instance root, that the first and second spanning tree instances are merge-able.

5. The method of claim 1, wherein the merge-able determination comprises:
   determining if only one of the first and second spanning tree instances will be used, thereby indicating that the first and second spanning tree instances are conditionally merge-able;
   determining if the first and second spanning tree instances share a common multiple instance root; and
   determining, if the first and second spanning tree instances are conditionally merge-able and share a common multiple instance root, that the first and second spanning tree instances are merge-able.

6. The method of claim 1, wherein the merge-able determination comprises implementing a conditional reduction.

7. The method of claim 6, wherein the conditional reduction comprises:
   determining a forwarding symmetric difference between a forwarding link set of each of the first and second spanning tree instances;

determining a blocking symmetric difference between a blocking link set of each of the first and second spanning tree instances;
determining an intersection of the forwarding symmetric difference and the blocking symmetric difference; and
determining, if the intersection is empty, that the first and second spanning tree instances are conditionally merge-able.

8. A system operable within a network implementing a multiple parallel topology in at least one network portion of the network, the system comprising:
a topology instance merge-ability analyzer configured to:
receive first and second spanning tree instances corresponding to the at least one network portion, the network having a plurality of participating stations;
determine an optimal root for each of the first and second spanning tree instances;
access configuration information from each of the first and second spanning tree instances, wherein the configuration information comprises a forwarding port, a blocked port, and the optimal root; and
compare the configuration information accessed from the first and second spanning tree instances to determine whether the first and second spanning tree instances are merge-able, the merge-able determination implementing a subtree reduction comprising:
determining if at least one of a forwarding port set and a blocking port set of each of the first and second spanning tree instances are substantially equivalent;
determining if one of the first and second spanning tree instances is a superset of remaining spanning tree instances; and
determining, if at least one of a forwarding port set and a blocking port set of each of the first and second spanning tree instances are substantially equivalent and if one of the first and second spanning tree instances is a superset of remaining spanning tree instances, that the first and second spanning tree instances are conditionally merge-able; and
a topology instance merger coupled to the instance merge-ability analyzer, the topology instance merger being configured to:
merge the first and second spanning tree instances into a merged topology instance when the merge-able determination indicates that the first and second spanning tree instances are merge-able; and
deploy one or more merge indicators to the plurality of participating stations to indicate that the first and second spanning tree instances have been merged into the merged topology instance, the one or more merge indicators being used by the participating stations to perform a corresponding merging of the first and second spanning tree instances.

9. The system of claim 8, wherein the topology instance merge-ability analyzer comprises:
a multiple topology instance root comparer; and
at least one of a multiple instance forwarding path comparer and a topology instance use determiner.

10. The system of claim 8, wherein the topology instance merge-ability analyzer comprises a subtree reduction analyzer.

11. The system of claim 8, wherein the topology instance merge-ability analyzer comprises a conditional reduction analyzer.

12. A non-transitory computer-readable storage medium, storing instructions executed by a computer, comprising:
one or more instructions for receiving in an instance merger of a network device on a network, first and second spanning tree instances corresponding to a network portion of the network, the network having a plurality of participating stations;
one or more instructions for determining an optimal root for each of the first and second spanning tree instances;
one or more instructions for accessing configuration information from each of the first and second spanning tree instances, wherein the configuration information comprises a forwarding port, a blocked port, and the optimal root;
one or more instructions for comparing the configuration information accessed from the first and second spanning tree instances to determine whether the first and second spanning tree instances are merge-able, the merge-able determination implementing a subtree reduction comprising:
determining if at least one of a forwarding port set and a blocking port set of each of the first and second spanning tree instances are substantially equivalent;
determining if one of the first and second spanning tree instances is a superset of remaining spanning tree instances; and
determining, if at least one of a forwarding port set and a blocking port set of each of the first and second spanning tree instances are substantially equivalent and if one of the first and second spanning tree instances is a superset of remaining spanning tree instances, that the first and second spanning tree instances are conditionally merge-able;
one or more instructions for merging the first and second spanning tree instances into a merged topology instance when the merge-able determination indicates that the first and second spanning tree instances are merge-able; and
one or more instructions for deploying one or more merge indicators to the plurality of participating stations to indicate that the first and second spanning tree instances have been merged into the merged topology instance, the one or more merge indicators being used by the participating stations to perform a corresponding merging of the first and second spanning tree instances.

13. The non-transitory computer-readable storage medium of claim 12, wherein at least one of the spanning tree instances comprises an IEEE 802.1s multiple spanning tree protocol (MSTP) topology.

14. The non-transitory computer-readable storage medium of claim 12, wherein at least one of the spanning tree instances comprises a spanning tree topology in accordance with at least one of IEEE 802.1s and Multiple Instance Spanning Tree Protocol (MISTP).

15. A method for reducing spanning tree instances in a network, the method comprising:
receiving in an instance merger of a network device on the network, first and second spanning tree instances corresponding to a portion of the network, the network having a plurality of participating stations;
determining an optimal root for each of the first and second spanning tree instances;
accessing configuration information from each of the first and second spanning tree instances, wherein the configuration information comprises a forwarding port, a blocked port, and the optimal root;

comparing the configuration information accessed from the first and second spanning tree instances to determine whether the first and second spanning tree instances are merge-able, the merge-able determination implementing a conditional reduction comprising:
- determining a forwarding symmetric difference between a forwarding link set of each of the first and second spanning tree instances;
- determining a blocking symmetric difference between a blocking link set of each of the first and second spanning tree instances;
- determining an intersection of the forwarding symmetric difference and the blocking symmetric difference; and
- determining, if the intersection is empty, that the first and second spanning tree instances are conditionally merge-able;

merging the first and second spanning tree instances into a merged topology instance when the merge-able determination indicates that the first and second spanning tree instances are merge-able; and deploying one or more merge indicators to the plurality of participating stations to indicate that the first and second spanning tree instances have been merged into the merged topology instance, the one or more merge indicators being used by the participating stations to perform a corresponding merging of the first and second spanning tree instances.

16. The method of claim 15, wherein at least one of the spanning tree instances comprises an IEEE 802.1s multiple spanning tree protocol (MSTP) topology.

17. The method of claim 15, wherein at least one of the spanning tree instances comprises a spanning tree topology in accordance with at least one of IEEE 802.1s and Multiple Instance Spanning Tree Protocol (MISTP).

18. The method of claim 15, wherein the merge-able determination comprises:
- determining if an instance forwarding path of the first and second spanning tree instances are the same, thereby indicating that the first and second spanning tree instances are conditionally merge-able;
- determining if the first and second spanning tree instances share a common multiple instance root; and
- determining, if the first and second spanning tree instances are conditionally merge-able and share a common multiple instance root, that the first and second spanning tree instances are merge-able.

19. The method of claim 15, wherein the merge-able determination comprises:
- determining if only one of the first and second spanning tree instances will be used, thereby indicating that the first and second spanning tree instances are conditionally merge-able;
- determining if the first and second spanning tree instances share a common multiple instance root; and
- determining, if the first and second spanning tree instances are conditionally merge-able and share a common multiple instance root, that the first and second spanning tree instances are merge-able.

20. The method of claim 15, wherein the merge-able determination comprises a subtree reduction.

21. The method of claim 20, wherein the subtree reduction comprises:
- determining if at least one of a forwarding port set and a blocking port set of each of the first and second spanning tree instances are substantially equivalent;
- determining if one of the first and second spanning tree instances is a superset of remaining spanning tree instances; and
- determining, if at least one of a forwarding port set and a blocking port set of each of the first and second spanning tree instances are substantially equivalent and if one of the first and second spanning tree instances is a superset of remaining spanning tree instances, that the first and second spanning tree instances are conditionally merge-able.

* * * * *

UNITED STATES PATENT AND TRADEMARK OFFICE
CERTIFICATE OF CORRECTION

PATENT NO. : 7,701,881 B1  Page 1 of 1
APPLICATION NO. : 10/893071
DATED : April 20, 2010
INVENTOR(S) : Genesh Chennimalai Sankaran It is certified that error appears in the above-identified patent and that said Letters Patent is hereby corrected as shown below:

Title Page; item (75);
Inventor name spelled incorrectly, please delete "Genesh Chennimalal Sankaran" and add
--Genesh Chennimalai Sankaran--

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,701,881 B1
APPLICATION NO. : 10/893071
DATED : April 20, 2010
INVENTOR(S) : Ganesh Chennimalai Sankaran It is certified that error appears in the above-identified patent and that said Letters Patent is hereby corrected as shown below:

In the Title page, item (75), please replace
"Genesh Chennimalai Sankaran" with "Ganesh Chennimalai Sankaran"

Signed and Sealed this
Second Day of June, 2015

Michelle K. Lee
*Director of the United States Patent and Trademark Office*